United States Patent [19]

Kano et al.

[11] Patent Number: 5,422,333

[45] Date of Patent: Jun. 6, 1995

[54] EXHAUST GAS PURIFYING CATALYST

[75] Inventors: Yasuhide Kano; Yoshimi Kawashima; Toshiaki Hayasaka, all of Sodegaura; Hiroshi Akama, Yokohama, all of Japan

[73] Assignees: Idemitsu Kosan Company Limited; Nissan Motor Co., Ltd., both of Tokyo, Japan

[21] Appl. No.: 110,377

[22] Filed: Aug. 23, 1993

[30] Foreign Application Priority Data

Aug. 25, 1992 [JP]  Japan .................................. 4-225888

[51] Int. Cl.$^6$ ............................................. B01J 29/04
[52] U.S. Cl. ..................... 502/60; 423/213.2; 423/239.2
[58] Field of Search ............. 502/60; 423/213.2, 239.2

[56] References Cited

U.S. PATENT DOCUMENTS

| | | | |
|---|---|---|---|
| 3,346,328 | 10/1967 | Sergeys et al. | 502/60 |
| 3,354,096 | 11/1967 | Young | 502/60 |
| 4,122,039 | 10/1978 | Kobylinski et al. | 423/213.2 |
| 4,867,954 | 9/1989 | Staniulis et al. | 423/239 |
| 5,017,538 | 5/1991 | Takeshima | 502/60 |
| 5,024,981 | 6/1991 | Speronello et al. | 502/67 |

FOREIGN PATENT DOCUMENTS

| | | |
|---|---|---|
| 0299294 | 1/1989 | European Pat. Off. . |
| 0373665 | 6/1990 | European Pat. Off. . |
| 0463626 | 1/1992 | European Pat. Off. . |
| 0494388 | 7/1992 | European Pat. Off. . |
| 3941541 | 6/1990 | Germany . |
| 63-100919 | 5/1988 | Japan . |
| 3182035 | 7/1988 | Japan . |
| 63-283727 | 11/1988 | Japan . |
| 1-130735 | 5/1989 | Japan . |
| 2-149317 | 6/1990 | Japan . |
| 4-4045 | 1/1992 | Japan . |

*Primary Examiner*—Asok Pal
*Attorney, Agent, or Firm*—Flynn, Thiel, Boutell & Tanis

[57] ABSTRACT

An exhaust gas purification catalyst of high resistance which allows highly effective purification of nitric oxide into nontoxic gas, even for an exhaust gas containing oxygen at a high concentration. A carrier of the catalyst includes crystalline pentasil-type aluminosilicate and supports copper and phosphori, the amount of the phosphori being supported ranges from 0.01% to 6.0% by weight as a conversion to $P_2O_5$, and ratio of the phosphorus to the copper, i.e., P/Cu (molar ratio) is in $0<(P/Cu)\leq 0.7$. A method of reducing and eliminating a nitrogen oxide in an exhaust gas in the presence of a hydrocarbon having a ratio of an overall THC concentration/$NO_x$ concentration of 0.5–50 at a reaction temperature of 200°–800° C. in an oxidative atmosphere.

13 Claims, No Drawings

EXHAUST GAS PURIFYING CATALYST

BACKGROUND OF THE INVENTION

1. FIELD OF THE INVENTION

The present invention concerns an exhaust gas purifying catalyst which decomposes, into non-toxic gases, nitrogen oxides discharged from mobile internal combustion engines used, for example, in diesel cars, stationary internal combustion engines used, for example, in cogeneration systems and various industrial furnaces such as boilers.

2. DESCRIPTION OF THE RELATED ART

Generally, exhaust gases discharged from automobiles, stationary internal combustion engines and various industrial furnaces contain a great amount of nitrogen oxides represented by NO and $NO_2$ ($NO_x$).

It is said that such $NO_x$ not only causes photochemical smog but also induces disease in man's respiratory organs. As a method of decreasing $NO_x$, an exhaust gas processing technique using a so-called ternary catalyst system is established that eliminates $NO_x$ by reduction in an exhaust gas of low oxygen content such as that from gasoline cars by using a reducing agent such as carbon monoxide or hydrocarbon.

On the other hand, in the case of an exhaust gas containing a great amount of oxygen such as that discharged from large-scaled stationary exhaust emission sources such as boilers, a selective $N_x$ reduction process for decreasing the amount of $NO_x$ by external addition of ammonia is now under actual operation, which produces some effect.

However, the former method is applicable only to an exhaust gas from a gasoline engine in which the oxygen concentration is extremely low whereas the latter method is difficult to use in small-sized stationary exhaust emission sources or mobile exhaust emission sources from a standpoint of handling because ammonia is used.

In view of the above, various methods have been studied for using hydrogen, carbon monoxides or various hydrocarbons as reducing agents other than ammonia, but most of them have the drawback that they are a non-selective catalytic reduction process which can eliminate nitrogen oxides only after oxygen in the exhaust gas has been consumed completely.

Although the following methods have been proposed so far as a novel selective catalytic reduction process capable of overcoming such a drawback ( methods of selectively reducing and eliminating nitrogen oxides even under the coexistence of oxygen), none of them can provide quite satisfactory results.

Published unexamined Japanese patent application Hei 2-149317 proposes a method of using either (1) a catalyst comprising a hydrogen type mordenite or clinoptilolite or (2) a catalyst comprising a hydrogen type mordenite or clinoptilolite supporting a metal such as Cu, Cr, Mn, Fe and Ni, and bringing exhaust smoke containing oxygen resulting from combustion of various fuel into contact with the above-mentioned catalyst under the coexistence of an organic compound thereby eliminating nitrogen oxides in the exhaust smoke. , According to this method, a denitrating ratio of 30 to 60% is achieved under the conditions of a reaction temperature of 300° to 600° C. and a gas hourly space velocity (GHSV) of 1200 $h^{-1}$, but a denitrating effect under a high GHSV condition, i.e., a condition approximate to that of practical use is not clear. Further, no literature gives a description of the aging of the catalytic activity and specified life of the catalyst. Further, since the catalyst is evaluated using a pseudo exhaust gas containing no $SO_x$, the resistance of the catalyst to $SO_x$ is uncertain.

Published unexamined Japanese patent application Hei 1-130735 proposes a method of using a catalyst in which a zeolite ion-exchanged with a transition metal (Cu, Co, Ni, Fe, Mg, Mn or the like) is carried on a fire resistant support, and purifying nitrogen oxides even in an oxidative atmosphere.

This is a method of purifying nitrogen oxides in an exhaust gas from a gasoline engine at high efficiency even in a lean air/fuel ratio region, in which the oxygen concentration in the exhaust gas is about 3% at most. Accordingly, it is uncertain whether or not nitrogen oxides can be selectively denitrated by reduction also in an exhaust gas such as that under a lean condition of high air fuel ratio in a gasoline or from a diesel engine in which the oxygen concentration is from 5 to 10%. Also in the examples, the $NO_x$ eliminating ratio tends to be lowered greatly along with an increase in the oxygen concentration and the permanence thereof is not clear.

Published unexamined Japanese patent application Sho 63-283727 proposes a method of using a catalyst in which a metal such as Cu, V, Mn, Fe or Cr is supported on a hydrophobic zeolite with a $SiO_2/Al_2O_3$ ratio of 15 or more, and decreasing nitrogen oxides in an oxygen containing exhaust gas from an internal combustion engine in the presence of carbon monoxide and one kind or more of hydrocarbons.

In this method, the denitrating ratio is decreased to as low a value as 4 to 26% in the case of using a zeolite catalyst supporting a metal other than copper. On the other hand, in the case of using a copper-zeolite catalyst, a permanence is not always clear though relatively high activity is obtained. The oxygen concentration in the exhaust gas shown in the examples is 1.6% and it is uncertain whether or not nitrogen oxides can also be reduced selectively for denitration if the oxygen concentration is higher, for example, as in an exhaust gas under a lean condition of high air fuel ratio in a gasoline or from a diesel engine.

Published unexamined Japanese patent application Sho 63-100919 proposes a method of using a catalyst in which copper is supported on a porous support of alumina, silica or zeolite, and eliminating nitrogen oxides in an exhaust gas containing oxygen in the presence of a hydrocarbon.

In this method, the denitrating ratio is from 10 to 25% and no high denitrating activity is obtainable. Further, since the catalyst contains copper, there is the problem that the copper ingredient is readily poisoned by $SO_x$. Further, the oxygen concentration in the exhaust gas shown in the examples is 2.1% and it is uncertain whether or not nitrogen oxides can also be reduced selectively for denitration if the oxygen concentration is higher. Also, the permanence thereof is uncertain.

Published unexamined Japanese patent application Hei4-4045 discloses an exhaust gas treatment catalyst in which copper and certain metal(s) coexisting with the crystalline silicate defined by the given formula and exhibits the specific X-ray diffraction pattern.

This catalyst contains one or more of 27 different metals coexisting with the crystalline silicate. However, the difference in advantages or the comparative merits resulting from the metal(s) used is unclear. The preferable ranges of contents per carrier of 100 parts by weight are relatively wide: 0.2 to 8 and 0.1 to 6 parts by weight for copper and other metals, respectively. In addition, the optimum content for each of the 27 metals is unclear. It is assumed that the amount of the given metal(s) coexisting depends on that of the copper supported. However, only the preferable amount of copper is defined for this catalyst and the optimum amount of the given metal(s) relative to the copper, i.e., [given metal(s)/copper (molar ratio)] is not clear.

In this respect, the present invention is directed to providing an exhaust gas purification catalyst of high resistance which allows highly effective purification of nitric oxide into a nontoxic gas, even for an exhaust gas containing oxygen at a high concentration.

SUMMARY OF THE INVENTION

An exhaust gas purification catalyst according to the present invention is for removing nitric oxide (NOx) in the exhaust gas by means of reducing the same in an atmosphere of oxygen and in the presence of hydrocarbon, wherein a carrier of the catalyst including crystalline pentasil-type aluminosilicate supports copper and phosphori, the amount of the phosphori being supported ranges from 0.01% to 6.0% by weight as a conversion to $P_2O_5$, and ratio of the phosphorus to the copper, i.e., P/Cu (molar ratio) is in $0<(P/Cu)\leq0.7$.

The oxidative atmosphere means herein an atmosphere containing an amount of oxygen in excess of that required for completely oxidizing a carbon monoxide, hydrogen and hydrocarbon contained in an exhaust gas and a reducing substance of a hydrocarbon added as required in this process and converting them into $H_2O$ and $CO_2$.

The above mentioned coppers may be in the form of a soluble salt when it is supported on the carrier using the ion exchange or impregnation techniques and when added in the catalyst during synthesis of zeolite. Examples of the soluble salts are: nitrate, halogen-containing compounds, carbonate, salt of organic acid and copper ammine complex. For adding the coppers in the catalyst by means of physical mixture, oxide and hydroxide may be used besides the soluble salt.

The content of the coppers per volume of catalyst is, as a conversion to CuO, in the range of 0.8 wt. % to 30.0 wt. % and preferably 2.0 wt. % to 15.0 wt. %.

The above mentioned phosphori may be the simple substance or a compound of phosphorus.

Examples of the simple substance of phosphorus are yellow phosphorus and red phosphorus.

The phosphorus compound may be one or more selected from the group consisting of, for example, (a) inorganic phosphoric acid of low oxidation number; alkaline metal and ammonium salts thereof such as orthophosphoric acid, hypophosphoric acid, phosphorous acid and hypophosphorous acid, (b) condensed phosphoric acid represented by polyphosphoric acid such as pyrophosphoric acid, tripolyphosphoric acid and tetrapolyphosphoric acid and metaphosphoric acid such as trimetaphosphoric acid, tetraphosphoric acid and hexametaphosphoric acid; alkaline metal and ammonium salts thereof, (c) phosphorus chalcogenide, (d) organic phosphorus, (e) organic phosphoric acid and (f) organic phosphoric acid salt.

More particulary, a phosphates of alkaline metal salts (e.g., lithium salt and sodium salt) and phosphate (e.g., ammonium salt) can provide a highly thermoresistant catalyst.

The phosphori may be supported using techniques including impregnation, liquid reaction, vapor deposition and ion exchange or be added to the catalyst during synthesis of the zeolite.

The content of the phosphori per volume of catalyst is, as a conversion to $P_2O_5$, in the range of 0.01 wt. % to 6.0 wt. %, preferably 0.01 wt. % to 4.0 wt. %, and more preferably 0.01 wt. % to 2.0 wt. %. Features of the present invention, high purification activity and resistance, cannot be obtained with a content of less than 0.01 wt. %. A content over 6.0 wt. % badly affect on the exhaust gas purification capability and the resistance will never be improved. The ratio of the phosphorus in the phosphori to the copper in the coppers, i.e., P/Cu (molar ratio) is in $0<(P/Cu)\leq0.7$, preferably $0<(P/Cu)\leq0.3$ and more preferably $0<(P/Cu)\leq0.2$. P/Cu of larger than 0.7 deteriorates the exhaust gas purification capability and the resistance will never be improved.

The crystalline pentasil-type aluminosilicate is a zeolite having five-membered ring such as ferrierite, mordenite, ZSM-5 and ZSM-11.

Zeolites other than the crystalline pentasil-type aluminosilicate are relatively low in hydrothermal resistance, which may result in deteriorated resistance of a catalyst supporting the phosphori.

Suitable crystalline pentasil-type aluminosilicate has $SiO_2/Al_2O_3$ (molar ratio) of not less than ten.

One having $SiO_2/Al_2O_3$ (molar ratio) of smaller than ten is relatively low in hydrothermal resistance, which may results in deteriorated resistance of a catalyst supporting the phosphori.

In addition, a crystalline pentasil-type aluminosilicate having MFI structure is preferable. The MFI structure is the same or similar to the structure of ZSM-5 such as those of ZSM-8, ZSM-11, zeta 1, zeta 3, Nu-4, Nu-5, TZ-1 and TPZ-1.

The most preferable crystalline pentasil-type aluminosilicate has an interstitial space (d) measured by the X-ray powder method set forth in the following Table 1.

TABLE 1

| INTERSTITIAL SPACE (d) | RELATIVE STRENGTH |
|---|---|
| 4.60 ± 0.08 | WEAK |
| 4.25 ± 0.08 | WEAK |
| 3.85 ± 0.07 | VERY STRONG |
| 3.71 ± 0.05 | STRONG |
| 3.04 ± 0.03 | WEAK |
| 2.99 ± 0.02 | WEAK |
| 2.94 ± 0.02 | WEAK |

The above mentioned crystalline pentasil-type aluminosilicate is preferably synthesized using mordenite as the seed crystal. Either natural or synthetic mordenite can be used preferably as long as it has the interstitial space (d) measured by the powder X-ray method set forth in the following Table 2. In addition, it is preferable to use mordenite having a C-axis direction length of not less than 2 μm.

TABLE 2

| INTERSTITIAL SPACE (d) | RELATIVE STRENGTH |
|---|---|
| 3.84 ± 0.10 | MEDIUM |
| 3.80 ± 0.10 | WEAK |
| 3.48 ± 0.07 | MEDIUM |
| 3.40 ± 0.07 | MEDIUM |
| 3.23 ± 0.07 | STRONG |
| 3.21 ± 0.07 | STRONG |
| 2.90 ± 0.07 | MEDIUM |

TABLE 2-continued

| INTERSTITIAL SPACE (d) | RELATIVE STRENGTH |
|---|---|
| 2.50 ± 0.05 | WEAK |

The catalyst may be in any suitable shapes, e.g., pellet-, plate-, pole- or lattice-shape. The catalyst may be applied to the surface of a lattice-like carrier or a gauze made of corjelite, mullite or alumina, for example. The catalyst according to the present invention can be prepared by means of supporting copper and phosphori on the crystalline pentasil-type aluminosilicate using an adequate technique including ion exchange, impregnation, physical mixture and vapor deposition.

It can also be prepared by adding the copper and phosphori to a gel during synthesis of zeolite. On preparing the catalyst, the copper and phosphori can be added simultaneously or subsequently with some time interval.

The catalyst according to the present invention can be prepared through various procedures.

In a method for purifying an exhaust gas with the exhaust gas purification catalyst according to the present invention, nitric oxide in the exhaust gas is exposed to the catalyst and reduced into $N_2$ and $H_2O$ in an atmosphere of oxygen and in the presence of hydrocarbon of 0.5–200 in THC/NOx concentration.

The THC (total hydrocarbon) concentration means the concentration of a hydrocarbon as converted to methane.

The practical reaction conditions regarding to the concentration of the hydrocarbon is 0.5–200 in THC/NOx, and preferably 1–100. For example, NOx concentration of 100 ppm is for THC concentration of 50–20,000 ppm.

No denitration will be exhibited with the hydrocarbon of less than the above mentioned lower limit. On the contrary, the higher NOx removal efficiency can be provided with the hydrocarbon of more than the upper limit, which is inadequate by the economic consideration of the system and abnormal heating of the catalyst bed due to the combustion heat of the hydrocarbon.

The hydrocarbon described above may be a hydrocarbon remaining in the exhaust gas, but it is preferred to add a hydrocarbon from the outside if the amount of the hydrocarbon is less than its amount required for causing the denitrating reaction or if it is not contained at all in the exhaust gas.

There is no particular restriction on the kind of the hydrocarbon to be added for this purpose and they may be methane, LPG, gasoline, gas oil, kerosene, A heavy oil or the like.

The catalytic reaction temperature is set to 200° to 800° C., and preferably, 300° to 600° C. Usually, the denitrating ratio is increased as the temperature is raised, but, if it exceeds 800° C., undesirable degradation of the catalyst occurs and, on the other hand, the denitrating ratio is lowered if the temperature is lower than 200° C.

The gas hourly space velocity (GHSV) is set usually to 2,000 to 200,000 $h^{-1}$, and preferably, 5,000 to 100,000 $h^{-1}$. If the GHSV is less than 2,000 $h^{-1}$, the amount of the catalyst used is increased though the denitrating ratio is high and, on the other hand, if it is higher than 200,000 $h^{-1}$, the denitrating ratio is lowered.

Exhaust gases as the object of the purification method according to the present invention are those gases containing $NO_x$ and oxygen in an oxidative atmosphere as a whole and are exhaust gases discharged from mobile internal combustion engines of gasoline cars which perform lean combustion or diesel cars, stationary internal combustion engines, for example, of cogeneration, and various kinds of industrial furnaces such as boilers.

DETAILED DESCRIPTION OF THE PREFERRED EMBODIMENT(S)

EXAMPLE 1

Prepared were: solution I consisting of 337.5 g of aluminum sulfate, 362.5 g of sulfuric acid (97%) and 8250 g of water; solution II consisting of 5275 g of water glass ($SiO_2$ 28.4%, $Na_2O$ 9.5%) and 5000 g of water; and solution III consisting of 987.5 g of sodium chloride and 2300 g of water.

The solutions I and II were simultaneously added dropwise to the solution III with stirring. The reaction mixture was adjusted to pH 9.5 with sulfuric acid and 12.5 g of mordenite [$SiO_2/Al_2O_3$=20 (molar ratio)] was added thereto as the seed crystal.

The resultant reaction mixture was poured into a 25-liter autoclave and permitted to stand for 20 hours with stirring at self-pressure, 170° C. and 300 rpm. After cooling, the reaction mixture was filtered and the precipitants were washed sufficiently with the excess purified water. Thereafter, it was dried at 120° C. for 20 hours to synthesize aluminosilicate zeolite having ZSM-5 structure (MFI structure). This aluminosilicate zeolite was measured using the X-ray powder method and the results thereof are shown in Table 3.

TABLE 3

| INTERSTITIAL SPACE (d) | RELATIVE STRENGTH |
|---|---|
| 11.5 | STRONG |
| 10.3 | STRONG |
| 9.1 | WEAK |
| 7.5 | WEAK |
| 7.3 | WEAK |
| 6.5 | WEAK |
| 6.10 | WEAK |
| 5.64 | WEAK |
| 5.10 | WEAK |
| 4.65 | WEAK |
| 4.28 | WEAK |
| 3.86 | VERY STRONG |
| 3.75 | STRONG |
| 3.46 | WEAK |
| 3.06 | WEAK |
| 2.99 | WEAK |
| 2.96 | WEAK |
| 2.00 | WEAK |

This zeolite was subjected to calcination in an air flow at 550° C. for 6 hours.

$SiO_2/Al_2O_3$ (molar ratio) of the aluminosilicate zeolite obtained in the above manner was 32.

An aluminosilicate zeolite catalyst supporting phosphorus pentoxide and copper was synthesized with a solution of copper acetate and phosphorus pentoxide as well as the aluminosilicate zeolite. The content of the phosphori in the catalyst was 0.1 wt. % as a conversion to $P_2O_5$ and that of the coppers was 4.8 wt. % as a conversion to CuO. P/Cu (molar ratio) was 0.233.

This catalyst was evaluated on activities at the initial state and after steaming in the manner described below.

To evaluate the initial activity, the catalyst was charged at 2 cc into a stainless reaction pipe into which model gas was introduced as treatment gas under GHSV=80,000 $h^{-1}$. The composition of the model gas is: NOx 500 ppm; $O_2$ 4.5%, and LPG 833 ppm (approximately 2500 ppm in THC concentration). Accordingly, THC/NOx concentration becomes 5.

Gases discharged from an outlet of the reaction pipe was introduced into a chemiluminescent detector to determine NOx concentration. NOx removal efficiency of the model gas after the catalyst reaction was calculated by comparing the NOx concentration of the model gas before and after being introduced in the reaction pipe of 350° C. and 400° C., respectively. The results are shown in Table 4 below.

The activity after steaming was evaluated in the following manner. The catalyst prepared according to the present invention was permitted to stand for 8 hours at 650° C. under conditions of 10% water, 4.5% oxygen and GHSV=80,000 h−1. Thereafter, the cooled catalyst was charged into a stainless reaction pipe into which model gas was introduced as treatment gas, as in the case of evaluation of the initial activity. The NOx removal efficiency was calculated in the above mentioned manner for 350° C. and 400° C., respectively, of the reaction pipe. The results are given in Table 4 below.

EXAMPLES 2 THROUGH 9

In each Example, the catalyst was prepared in the same manner as the Example 1 except for the amount of the phosphorus and copper supported.

In Example 2, the content of the phosphori in the catalyst was 0.9 wt. % as a conversion to $P_2O_5$ and that of copper was 4.9 wt. % as a conversion to CuO. P/Cu (molar ratio) was 0.203.

In Example 3, the content of the phosphori in the catalyst was 1.0 wt. % as a conversion to $P_2O_5$ and that of copper was 4.8 wt. % as a conversion to CuO. P/Cu (molar ratio) was 0.233.

In Example 4, the content of the phosphori in the catalyst was 0.9 wt. % as a conversion to $P_2O_5$ and that of copper was 4.6 wt. % as a conversion to CuO. P/Cu (molar ratio) was 0.219.

In Example 5, the content of the phosphori in the catalyst was 0.9 wt. % as a conversion to $P_2O_5$ and that of copper was 4.0 wt. % as a conversion to CuO. P/Cu (molar ratio) was 0.252.

In Example 6, the content of the phosphori in the catalyst was 0.7 wt. % as a conversion to $P_2O_5$ and that of copper was 3.4 wt. % as a conversion to CuO. P/Cu (molar ratio) was 0.231.

In Example 7, the content of the phosphori in the catalyst was 1.4 wt. % as a conversion to $P_2O_5$ and that of copper was 4.6 wt. % as a conversion to CuO. P/Cu (molar ratio) was 0.341.

In Example 8, the content of the phosphori in the catalyst was 0.7 wt. % as a conversion to $P_2O_5$ and that of copper was 4.3 wt. % as a conversion to CuO. P/Cu (molar ratio) was 0.182.

In Example 9, the content of the phosphori in the catalyst was 1.4 wt. % as a conversion to $P_2O_5$ and that of copper was 4.1 wt. % as a conversion to CuO. P/Cu (molar ratio) was 0.383.

The catalysts obtained in the Examples 2 through 9 were subjected to evaluation of activities at the initial state and after steaming in the same manner as Example 1. The results are given in Table 4 below.

The catalysts obtained in the Examples 10 through 20 were also subjected to evaluation of activities.

EXAMPLES 10 AND 11

The catalysts were prepared in the same manner as the Example 1 except that orthophosphoric acid was used instead of phosphorus pentoxide.

In Example 10, the content of the phosphori in the catalyst was 0.8 wt. % as a conversion to $P_2O_5$ and that of copper was 3.8 wt. % as a conversion to CuO. P/Cu (molar ratio) was 0.236.

In Example 11, the content of the phosphori in the catalyst was 0.6 wt. % as a conversion to $P_2O_5$ and that of copper was 3.5 wt. % as a conversion to CuO. P/Cu (molar ratio) was 0.192.

EXAMPLE 12

Activities at the initial state and after steaming were evaluated in the same manner as the Example 1 except for the model gas of the higher oxygen concentration. The introduced composition of the model gas is: NOx 500 ppm; $O_2$ 10%, and LPG 833 ppm.

EXAMPLE 13

The catalyst was prepared in the same manner as Example 1 except that sodium pyrophosphate was used instead of phosphorus pentoxide. The content of the phosphori in the catalyst was 0.8 wt. % as a conversion to $P_2O_5$ and that of copper was 5.4 wt. % as a conversion to CuO. P/Cu (molar ratio) was 0.165.

EXAMPLE 14

The catalyst was prepared in the same manner as the Example 1 except that sodium hexametaphosphate was used instead of phosphorus pentoxide. The content of the phosphori in the catalyst was 0.9 wt. % as a conversion to $P_2O_5$ and that of copper was 4.8 wt. % .as a conversion to CuO. P/Cu (molar ratio) was 0.210.

EXAMPLES 15, 16, 17

The catalysts were prepared in the same manner as the Example 1 except that sodium tripolyphosphate was used instead of phosphorus pentoxide.

In Example 15, the content of the phosphori in the catalyst was 0.2 wt. % as a conversion to $P_2O_5$ and that of copper was 3.8 wt. % as a conversion to CuO. P/Cu (molar ratio) was 0.060.

In Example 16, the content of the phosphori in the catalyst was 0.5 wt. % as a conversion to $P_2O_5$ and that of copper was 4.7 wt. % as a conversion to CuO. P/Cu (molar ratio) was 0,119.

In Example 17, the content of the phosphori in the catalyst was 3.2 wt. % as a conversion to $P_2O_5$ and that of copper was 9.6 wt. % as a conversion to CuO. P/Cu (molar ratio) was 0.373.

EXAMPLES 18, 19

The catalysts were prepared in the same manner as Example 1 except that sodium metaphosphate was used instead of phosphorus pentoxide.

In Example 18, the content of the phosphori in the catalyst was 0.5 wt. % as a conversion to $P_2O_5$ and that of copper was 4.9 wt. % as a conversion to CuO. P/Cu (molar ratio) was 0.115.

In Example 19, the content of the phosphori in the catalyst was 3.3 wt. % as a conversion to $P_2O_5$ and that of copper was 9.1 wt. % as a conversion to CuO. P/Cu (molar ratio) was 0.403.

EXAMPLE 20

The catalyst was prepared in the same manner as Example 1 except that sodium phosphate was used instead of phosphorus pentoxide. The content of the phosphori in the catalyst was 0.4 wt. % as a conversion to $P_2O_5$ and that of copper was 4.2 wt. % as a conversion to CuO. P/Cu (molar ratio) was 0.102.

CONTROL 1

A catalyst supporting copper only was prepared in the same manner as Example 1 except that the impregnation with the phosphorus pentoxide solution was omitted. The content of copper in the catalyst was 4.0 wt. % as a conversion to CuO.

The obtained catalyst is subjected to evaluation of activities at the initial state and after steaming in the same manner as the Example 1. The results are given in Table 4 below.

The catalysts obtained in the Controls 2 through 4 were also subjected to evaluation of activities.

CONTROL 2

A catalyst supporting copper only was prepared in the same manner as Control 1 except that copper nitrate solution was used. The content of copper in the catalyst was 4.7 wt. % as a conversion to CuO.

CONTROLS 3, 4

In each of these Controls, the amount of the phosphori supported ranges at or more than 6% by weight as a conversion to $P_2O_5$, and ratio of the phosphorus to the copper, i.e., P/Cu (molar ratio) is at or more than 0.7.

In Control 3, a catalyst was prepared with a solution of copper nitrate and phosphorus pentoxide. The content of the phosphori in the catalyst was 7.9 wt. % as a conversion to $P_2O_5$ and that of copper was 4.5 wt. % as a conversion to CuO. P/Cu (molar ratio) was 1.97.

In Control 4, a catalyst was obtained with a solution of copper chloride and orthophosphoric acid in which the aluminosilicate zeolite was coimpregnated to contain 1 mmol/g of copper and phosphorus, respectively. The content of the phosphori in the catalyst was 7.1 wt. % as a conversion to $P_2O_5$ and that of copper was 8.0 wt. % as a conversion to CuO. P/Cu (molar ratio) was 0.99.

TABLE 4

| | ACTIVITIES AT INITIAL STATE | | ACTIVITIES AFTER STEAMING | |
|---|---|---|---|---|
| | 350° C. | 400° C. | 350° C. | 400° C. |
| Example 1 | 88 | 86 | 38 | 80 |
| Example 2 | 92 | 92 | 30 | 50 |
| Example 3 | 88 | 86 | 37 | 69 |
| Example 4 | 90 | 88 | 31 | 64 |
| Example 5 | 93 | 93 | 32 | 50 |
| Example 6 | 90 | 93 | 32 | 55 |
| Example 7 | 91 | 88 | 39 | 70 |
| Example 8 | 88 | 86 | 45 | 77 |
| Example 9 | 89 | 88 | 34 | 68 |
| Example 10 | 90 | 92 | 40 | 61 |
| Example 11 | 88 | 90 | 40 | 60 |
| Example 12 | 85 | 89 | 35 | 78 |
| Example 13 | 92 | 94 | 65 | 84 |
| Example 14 | 86 | 90 | 46 | 65 |
| Example 15 | 87 | 94 | 48 | 63 |
| Example 16 | 90 | 93 | 70 | 90 |
| Example 17 | 88 | 90 | 48 | 66 |
| Example 18 | 90 | 94 | 72 | 90 |
| Example 19 | 85 | 88 | 47 | 65 |

TABLE 4-continued

| | ACTIVITIES AT INITIAL STATE | | ACTIVITIES AFTER STEAMING | |
|---|---|---|---|---|
| | 350° C. | 400° C. | 350° C. | 400° C. |
| Example 20 | 88 | 90 | 62 | 88 |

TABLE 5

| | ACTIVITIES AT INITIAL STATE | | ACTIVITIES AFTER STEAMING | |
|---|---|---|---|---|
| | 350° C. | 400° C. | 350° C. | 400° C. |
| Control 1 | 85 | 82 | 16 | 35 |
| Control 2 | 87 | 84 | 20 | 40 |
| Control 3 | 50 | 80 | 12 | 32 |
| Control 4 | 60 | 78 | 10 | 25 |

Consideration on Examples and Controls

In Table 4, Examples 1 through 20 show that the catalyst activity is superior to the catalysts in the Controls after steaming at 350° C. of reaction temperature because the catalyst carrier containing the crystalline pentasil-type aluminosilicate supports copper and phosphori in which the amount of the phosphori supported in the catalyst ranges from 0.01 wt. % 6.0 wt. % as a conversion to $P_2O_5$ and P/Cu (molar ratio) is in $0<(P/Cu)\leq 0.7$. The higher reaction temperature of 400° C. sufficiently improves the catalyst activity as compared with the case of 350° C.

The catalyst according to the present invention is thus highly resistant and exhibits high activity after being used for a long time.

On the contrary, the catalysts according to Controls 1 and 2, in Table 5, support coppers only and support no phosphori, so that the activity after steaming at the reaction temperature of 350° C. is sufficiently deteriorated as compared with the Examples, through there is little difference of the initial activities therebetween. The higher reaction temperature of 400° C. cannot result in the improved catalyst activity as in the case of Examples.

The catalysts according to Controls 3 and 4 support the copper and phosphori on the catalyst carrier containing the crystalline pentasil-type aluminosilicate. However, the amount of the phosphori supported in the catalyst is larger than 6.0 wt. % as a conversion to $P_2O_5$ and P/Cu (molar ratio) is larger than 0.7. This results in the catalyst having lower initial activity as compared with the catalysts supporting copper only according to Controls 1 and 2. In addition, the activity after steaming is equal or inferior to that of the catalysts according to Controls 1 and 2 for either of the case of 350° C. and 400° C. The activity after steaming is not improved.

Accordingly, the catalysts according to the Controls have less resistance causing degradation of catalyst activity during use.

Accordingly, the present invention is directed to provide an exhaust gas purification catalyst of a high resistance which allows highly effective purification of nitric oxide into nontoxic gas, even for the exhaust gas containing oxygen at a high concentration, thus to provide excellent purification performance, even if the reaction temperature is low.

What is claimed is:

1. An exhaust gas purification catalyst for removing nitric oxide (NOx) in the exhaust gas by means of reducing the same in an atmosphere of oxygen and in the presence of hydrocarbon, wherein the catalyst comprises a carrier of a crystalline aluminosilicate having a five-membered ring and with copper and phosphori supported thereon, the amount of the phosphori being supported ranges from 0.01% to 6.0% by weight as a conversion to $P_2O_5$, and the molar ratio of the phosphorus to the copper is $0<(P/Cu)\leq 0.7$.

2. The exhaust gas purification catalyst according to claim 1, wherein the copper is in the form of a soluble salt.

3. The exhaust gas purification catalyst according to claim 1, wherein the phosphori is a simple substance or a compound of phosphorus.

4. The exhaust gas purification catalyst according to claim 3, wherein the phosphorus compound is one or more members selected from the group consisting of inorganic phosphoric acid, condensed phosphoric acid, organic phosphoric acid, alkaline metal salts and ammonium salt thereof and phosphorus chalcogenide.

5. The exhaust gas purification catalyst according to claim 4, wherein the inorganic phosphoric acid is orthophosphoric acid, hypophosphoric acid, phosphorous acid or hypophosphorous acid.

6. The exhaust gas purification catalyst according to claim 4, wherein the condensed phosphoric acid is polyphosphoric acid or metaphosphoric acid.

7. The exhaust gas purification catalyst according to claim 1, wherein the crystalline aluminosilicate has $SiO_2/Al_2O_3$ molar ratio of not less than ten.

8. The exhaust gas purification catalyst according to claim 1, wherein the crystalline aluminosilicate has a MFI structure.

9. The exhaust gas purification catalyst according to claim 8, wherein the MFI structure is the same or similar to the structure of ZSM-5.

10. The exhaust gas purification catalyst according to claim 1, wherein the crystalline pentasil-type aluminosilicate has an interstitial space (d), as measured by the X-ray powder method, set forth in the following Table 6,

TABLE 6

| INTERSTITIAL SPACE (d) | RELATIVE STRENGTH |
| --- | --- |
| 11.30 ± 0.30 | STRONG |
| 10.00 ± 0.30 | STRONG |
| 7.40 ± 0.20 | WEAK |
| 7.10 ± 0.20 | WEAK |
| 6.30 ± 0.20 | WEAK |
| 6.04 ± 0.20 | WEAK |
| 5.56 ± 0.10 | WEAK |
| 6.01 ± 0.10 | WEAK |

11. The exhaust gas purification catalyst according to claim 1, wherein the crystalline aluminosilicate is ferrierite or mordenite.

12. The exhaust gas purification catalyst according to claim 1, wherein the crystalline aluminosilicate is synthesized using mordenite as a seed crystal.

13. The exhaust gas purification catalyst according to claim 12, wherein the mordenite has an interstitial space (d), as measured by the powder X-ray method, set forth in the following Table 7,

TABLE 7

| INTERSTITIAL SPACE (d) | RELATIVE STRENGTH |
| --- | --- |
| 13.75 ± 0.20 | STRONG |
| 10.36 ± 0.20 | STRONG |
| 9.14 ± 0.20 | VERY STRONG |
| 6.61 ± 0.15 | MEDIUM |
| 6.42 ± 0.15 | MEDIUM |
| 6.10 ± 0.15 | WEAK |
| 5.92 ± 0.15 | MEDIUM |
| 4.60 ± 0.15 | MEDIUM |
| 4.01 ± 0.15 | STRONG |

* * * * *

UNITED STATES PATENT AND TRADEMARK OFFICE
CERTIFICATE OF CORRECTION

PATENT NO. : 5,422,333
DATED : June 6, 1995
INVENTOR(S) : Yasuhide KANO, et al.

It is certified that error appears in the above-indentified patent and that said Letters Patent is hereby corrected as shown below:

Column 11, line 12; change "a simple substance" to ---phosphorus---.

line 19; change "salt" to ---salts---.

line 28; after "has" insert ---a---.

line 37; delete "pentasil-type".

Signed and Sealed this

Seventeenth Day of October, 1995

Attest:

BRUCE LEHMAN

Attesting Officer

Commissioner of Patents and Trademarks